US012300903B2

(12) United States Patent
Chen et al.

(10) Patent No.: US 12,300,903 B2
(45) Date of Patent: May 13, 2025

(54) FEED NETWORK FOR IMPROVING CONVERGENCE OF LOBE WIDTH OF WIDEBAND ANTENNA

(71) Applicants: PROSE TECHNOLOGIES (SUZHOU) CO., LTD., Suzhou (CN); PROSE TECHNOLOGIES LLC, Mount Olive, NJ (US)

(72) Inventors: Guoqun Chen, Suzhou (CN); Shengguang Wang, Suzhou (CN); Zhongcao Yang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 597 days.

(21) Appl. No.: 17/561,428

(22) Filed: Dec. 23, 2021

(65) Prior Publication Data

US 2022/0123466 A1 Apr. 21, 2022

Related U.S. Application Data

(63) Continuation of application No. PCT/CN2019/105652, filed on Sep. 12, 2019.

(51) Int. Cl.

*H01Q 3/28* (2006.01)
*H01Q 3/36* (2006.01)
(Continued)

(52) U.S. Cl.

CPC ................. *H01Q 3/28* (2013.01); *H01Q 3/36* (2013.01); *H01Q 5/50* (2015.01); *H01Q 9/0421* (2013.01); *H01Q 9/0435* (2013.01); *H01Q 1/246* (2013.01)

(58) Field of Classification Search

CPC .. H01Q 3/28; H01Q 3/36; H01Q 5/50; H01Q 9/0421; H01Q 9/0435; H01Q 1/246;
(Continued)

(56) References Cited

U.S. PATENT DOCUMENTS 5,929,804 A 7/1999 Jones et al.
6,922,169 B2 7/2005 Moh'd Izzat et al.
(Continued)

FOREIGN PATENT DOCUMENTS

CN 2692852 Y 4/2005
CN 102683897 A 9/2012
(Continued)

OTHER PUBLICATIONS

The World Intellectual Property Organization (WIPO) International Search Report for PCT/CN2019/105652 Jun. 15, 2020 5 Pages (including translation).
(Continued)

*Primary Examiner* — Hai V Tran
*Assistant Examiner* — Michael M Bouizza
(74) *Attorney, Agent, or Firm* — ANOVA LAW GROUP, PLLC

(57) ABSTRACT

A feed network includes a first power divider, a delay line, a 90° electric bridge and a second power divider. The first power divider converts an input signal of the feed network into a first signal and a second signal, transmits the first signal to the delay line, and transmits the second signal to the 90° electric bridge directly. The delay line changes a phase of the first signal and transmits the first signal to the 90° electric bridge. The 90° electric bridge converts the received first signal and the received second signal into two signals having a same phase but different amplitudes, transmits one of the two signals to the second power divider, and outputs the other one of the two signals to a first radiator directly.
(Continued)

The second power divider outputs the one of the two signals to a second radiator.

16 Claims, 3 Drawing Sheets

(51) Int. Cl.
*H01Q 5/50* (2015.01)
*H01Q 9/04* (2006.01)
*H01Q 1/24* (2006.01)

(58) Field of Classification Search
CPC ...... H01Q 5/28; H01Q 21/0006; H01Q 21/08; H01Q 21/22
See application file for complete search history.

(56) References Cited

U.S. PATENT DOCUMENTS

| | | | | |
|---|---|---|---|---|
| 2004/0160361 | A1* | 8/2004 | Izzat et al. | H01Q 3/40 342/360 |
| 2013/0278460 | A1* | 10/2013 | Ai | H01Q 1/246 342/372 |
| 2013/0287144 | A1 | 10/2013 | Paulin et al. | |
| 2016/0013563 | A1* | 1/2016 | Timofeev | H01Q 21/22 343/853 |
| 2016/0226124 | A1* | 8/2016 | Fasenfest | H01P 5/185 |

FOREIGN PATENT DOCUMENTS

| | | | | |
|---|---|---|---|---|
| CN | 102714805 | A | | 10/2012 |
| CN | 105612812 | A | | 5/2016 |
| CN | 105742828 | A | | 7/2016 |
| CN | 106602279 | A | | 4/2017 |
| CN | 109193159 | A | | 1/2019 |
| JP | 2004266484 | A | * | 9/2004 |
| WO | 2012126405 | A2 | | 9/2012 |

OTHER PUBLICATIONS

A. N. Sensong et al., "Generalized analysis method for a class of novel wideband loaded-stub phase shifters." Radioengineering 24.4 (2015): 927-931.

Xinyi Tang et al., "Design of a UWB phase shifter using shunt λ/4 stubs." 2009 IEEE MTT-S International Microwave Symposium Digest. IEEE, 2009.

* cited by examiner

FEED NETWORK FOR IMPROVING CONVERGENCE OF LOBE WIDTH OF WIDEBAND ANTENNA

CROSS-REFERENCE TO RELATED APPLICATION

This application is a continuation application of PCT application PCT/CN2019/105652, filed on Sep. 12, 2019, the entire content of which is incorporated herein by reference.

FIELD OF THE DISCLOSURE

The present disclosure relates to the field of communication technologies, and more particularly to a feed network for improving a convergence of a lobe width of a wideband antenna.

BACKGROUND

As a core device that supports mobile communication network coverage, a base station antenna is an important part of a mobile communication system, which is used to convert high frequency electromagnetic energy in a transmission line into electromagnetic waves in free space or convert electromagnetic waves in the free space to high frequency electromagnetic energy, whose design directly affects the quality of the entire mobile communication system.

With the increase of mobile communication users and the occurrence of new applications and demands, the demand for base station antennas is becoming larger and larger, and the requirements for the base station antennas are increasingly strict, which often include requirements of circuit parameters and radiation parameters, such as standing wave ratio meeting the indicator requirements, stable gain, and stable radiation pattern, within a wide frequency band, such as 1.695 GHz 2.690 GHz, so that 2G, 3G, and 4G and other communication system requirements can be satisfied.

The amplitude provided by the conventional feed network in its operating frequency band for the radiator is a constant value, i.e., the amplitude does not vary with frequency or varies lightly. The amplitude allocation makes the lobe width of the wideband antenna change in its operating frequency band, which presents the change tendency that the larger the frequency, the narrower the lobe width. When the frequency is sufficiently high, the antenna width becomes narrow, and ultimately the antenna coverage is insufficient, which seriously affects the quality of the communication system.

SUMMARY

The object of the present disclosure is to overcome the deficiencies of the prior art and to provide a feed network for improving a convergence of a lobe width of a wideband antenna.

One aspect of the present disclosure provides a feed network for improving a convergence of a lobe width of a wideband antenna. The feed network includes a first power divider, a delay line, a 90° electric bridge and a second power divider. The first power divider is configured to convert an input signal of the feed network into a first signal and a second signal, transmit the first signal to the delay line, and transmit the second signal to the 90° electric bridge directly. The delay line is configured to change a phase of the first signal and transmit the first signal to the 90° electric bridge. The 90° electric bridge is configured to convert the received first signal and the received second signal into two signals having a same phase but different amplitudes, transmit one of the two signals to the second power divider, and output the other one of the two signals to a first radiator directly. The second power divider is configured to output the one of the two signals to a second radiator.

In some embodiments, the delay line includes a transmitting microstrip line body and a U-shaped member formed by bending the transmitting microstrip line body.

In some embodiments, a distance from a bottom of the transmitting microstrip line body to a bottom of the U-shaped member is greater than a wavelength of a feed network input signal.

In some embodiments, the delay line includes a first main transmitting microstrip line and a short-circuit microstrip line connected in a T-shape, and a non-short-circuit terminal of the short-circuit microstrip line is connected to the first main transmitting microstrip line, and a short-circuit terminal of the short-circuit microstrip line is provided with a grounding vias.

In some embodiments, a length of the short-circuit microstrip line is one quarter of the wavelength of the input signal of the feed network.

In some embodiments, the delay line includes a second main transmitting microstrip line and an open-circuit microstrip line connected in a T-shape, and a non-open-circuit terminal of the open-circuit microstrip line is connected to the second main transmitting microstrip line.

In some embodiments, a length of the open-circuit microstrip line is one-half of the wavelength of the input signal of the feed network.

In some embodiments, phases of the two signals input to the 90° electric bridge are reduced as the frequency increases.

In some embodiments, the first power divider and the second power divider are 3 dB Wilkinson power dividers.

In some embodiments, an output power distribution ratio of the second power divider is 1:N, wherein N is a natural number greater than 1.

The beneficial effect of the present disclosure is:

(1) With the design of a particular feed network, the phase difference of signals input to the 90° electric bridge is adjusted by the delay line, thereby changing the amplitude allocation of the signal output from the 90° electric bridge, so that different amplitudes can be allocated to radiators of the wideband antenna respectively, and the amplitude obtained by each radiator can vary as the frequency varies, so that the lobe width of the wideband antenna in the 1.695 GHz to 2.690 GHz can be controlled within 33°2.5°, which can effectively improve the convergence of the horizontal lobe width of the wideband antenna width, and improve the coverage of the base station.

(2) Using a delay line formed by short-circuit microstrip lines or open-circuit microstrip lines, the size of the feed network can also be effectively reduced.

Figure 1:
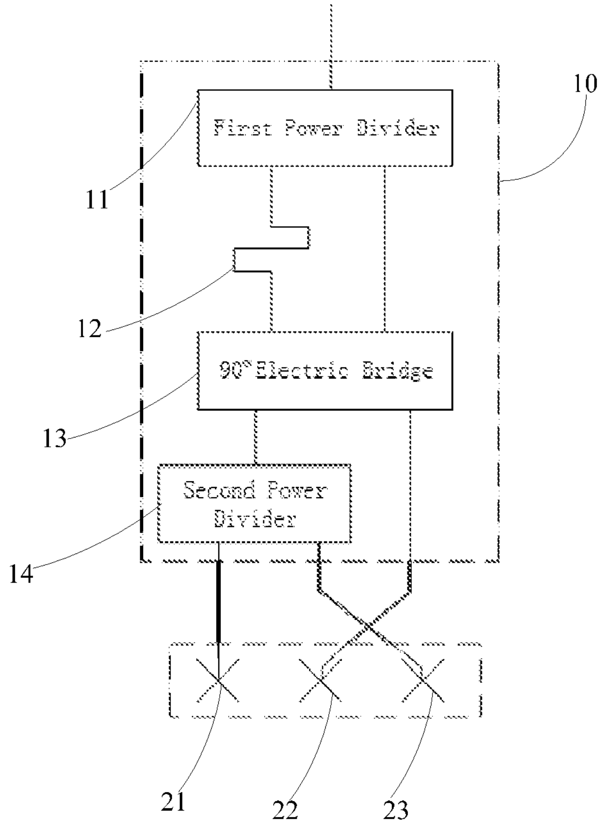
FIG. 1 is a block diagram of an example structure according to some embodiments of the present disclosure.

Reference numerals: 10. feed network, 11. first power divider, 12. delay line, 121*a*. transmitting microstrip line body, 121*b*. U-shaped member, 122*a*. first main transmitting microstrip line, 122*b*. short-circuit microstrip line, 122*c*. grounding vias, 123*a*. second main transmitting microstrip line, 123*b*. open-circuit microstrip line, 13. 90° electric bridge, 14. second power divider, 21. first radiator, 22. second radiator, 23. third radiator.

DETAILED DESCRIPTION

The technical solution of the embodiments of the present disclosure will be described in connection with the drawings of the present disclosure below.

The feed network disclosed in the present disclosure applied to a single beam antenna can change the phase of any one of the signals input to a 90° electric bridge 13 by using the delay line 12, thereby adjusting the phase difference between the signals input to the 90° electric bridge 13 to change the amplitude allocation of the signals output from the 90° electric bridge 13, such that signals of different amplitudes are allocated to different radiators of the wideband antenna respectively, and the amplitude obtained by each radiator can vary as the corresponding frequency varies, which effectively improves the convergence of horizontal lobe width of the wideband antenna and improves the coverage of a base station that the wideband antenna belongs to.

As shown in FIG. 1, a feed network 10 for improving a convergence of a lobe width of a broadband antenna according to an example embodiment of the present disclosure includes a first power divider 11, a delay line 12, a 90° electric bridge 13, and a second power divider 14. An input terminal of the first power divider 11 is used as the input port of the feed network, one output terminal of the first power divider 11 is coupled to an input terminal of the delay line 12, and the other output terminal of the first power divider 11 is directly coupled to an input terminal of the 90° electric bridge 13. The first power divider is configured to convert an input signal of the feed network into two signals (e.g., a first signal output to the delay line 12 and a second signal directly output to the 90° electric bridge 13) with the same amplitude and the same phase. An output terminal of the delay line 12 is coupled to the other input terminal of the 90° electric bridge 13. The delay line 12 is configured to change a phase of one of the two signals (e.g., the first signal) output from the first power divider 11 and then input the phase-changed signal to the 90° electric bridge 13, such that the two signals (e.g., the phase-changed first signal and the second signal) input to the 90° electric bridge 13 have the same amplitude and different phases. One of the output terminals of the 90° electric bridge 13 is directly coupled to a radiator (e.g., a first radiator) of the wideband antenna and the other of the output terminals of the 90° electric bridge 13 is coupled to the input terminal of the second power divider 14. The 90° electric bridge 13 is configured to convert the two signals with same amplitude and different phases into two signals with different amplitudes and same phase. Output terminals of the second power divider 14 are directly coupled to radiators of the wideband antenna. The second power divider 14 is configured to convert a signal output from the 90° electric bridge 13 into multiple signals.

In some embodiments, the first power divider 11 can convert the input signal of the feed network into two signals, and the phase of one of the two signals is changed by the delay line 12 before inputting to the 90° electric bridge 13, while the other of the two signals is directly input to the 90° electric bridge 13. The 90° electric bridge 13 can change the received two signals into the two signals with same phase and different amplitudes, and send one of the two signals with same phase and different amplitudes to radiators via the second power divider 14, and the other of the two signals with same phase and different amplitudes to a radiator directly.

In the present embodiment, one output terminal of the 90° electric bridge 13 is coupled to a first radiator 21 and a third radiator 23, via the second power divider 14, respectively, and the other output terminal is coupled directly to a second radiator 22. In other embodiments, the two output terminals of the 90° electric bridge 13 can be coupled to a plurality of radiators via a power divider. In some embodiments, both the first power divider 11 and the second power divider 14 are 3 dB Wilkinson power dividers, wherein the output power distribution ratio of the second power divider 14 is 1:N (N is a natural number greater than 1). In one embodiment, N is 2, and in other embodiments, N can be determined based on the number of radiators in the wideband antenna.

Figure 2:
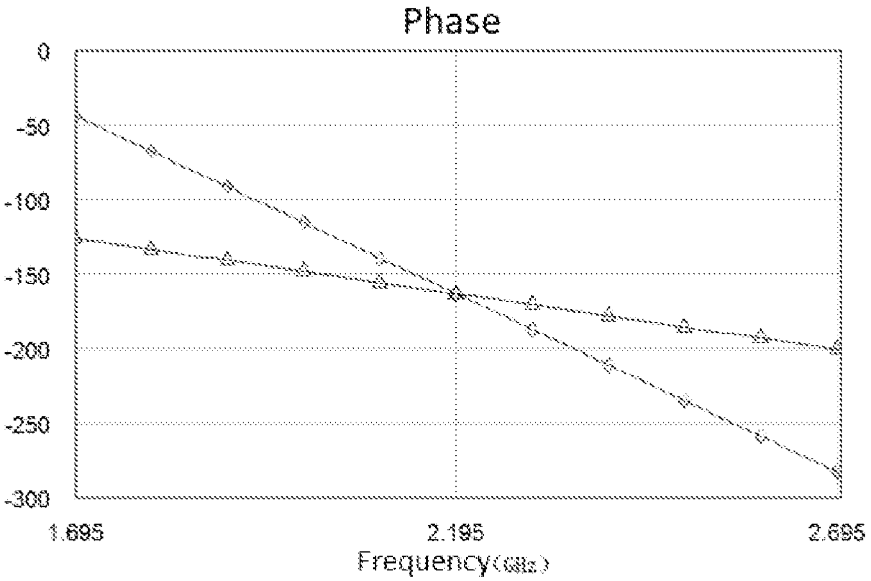
FIG. 2 is a schematic diagram showing phase distributions of two signals input to a 90° electric bridge according to some embodiments of the present disclosure.

In order to enable the wideband antenna to achieve a better lobe width convergence, the phase distribution of the two signals input to the 90° electric bridge 13 should satisfy the linear relationship as shown in FIG. 2. It can be seen from FIG. 2 that as the corresponding frequency increases, the phases of the two signals present a downward trend, and the phase difference between the two signals input to the 90° electric bridge 13 varies as the frequency varies, e.g., at 1.695 GHz, the phase of one signal is A, the phase of the other signal is B, the phase difference between the two signals is C, and e.g., at 2.195 GHz, the phases of the two signals are same, the phase difference between the two signals is 0, and e.g., at 2.695 GHz, the phase of one signal is A', the phase of the other signal is B', and the phase difference between the two signals is C'. By adjusting the phase difference between the signals input to the 90° electric bridge 13, the phase difference varies as the frequency varies, and the amplitude distribution of the signal output from the 90° electric bridge 13 varies as the frequency varies, such that the lobe width of the wideband antenna presents extreme convergence in the entire frequency band. The table below shows the amplitudes and phases of three radiators allocated by the 90° electric bridge 13 at different frequencies.

| | First radiator | | | Second radiator | | | Third radiator | | |
|---|---|---|---|---|---|---|---|---|---|
| Frequency | 1.695 | 2.4 | 2.69 | 1.695 | 2.4 | 2.69 | 1.695 | 2.4 | 2.69 |
| Amplitude | 0.69 | 0.5 | 0.41 | 0.23 | 0.7 | 0.8 | 0.69 | 0.5 | 0.41 |
| Phase | 0 | 0 | 0 | 0 | 0 | 0 | 0 | 0 | 0 |

It can be seen from the above table, at the same frequency, the amplitudes allocated for the different radiators are different, meanwhile at different frequencies, the amplitudes allocated for the different radiators are also different. It can be seen that the amplitude allocation of the signals output from the 90° electric bridge 13 is changed effectively by changing the phase differences between signals input to the 90° electric bridge 13 at different frequencies. This amplitude allocation variating as the frequency varies can cause the lobe width of the wideband antenna to present extreme convergence in 1.695 GHz~2.690 GHz.

Figure 3:
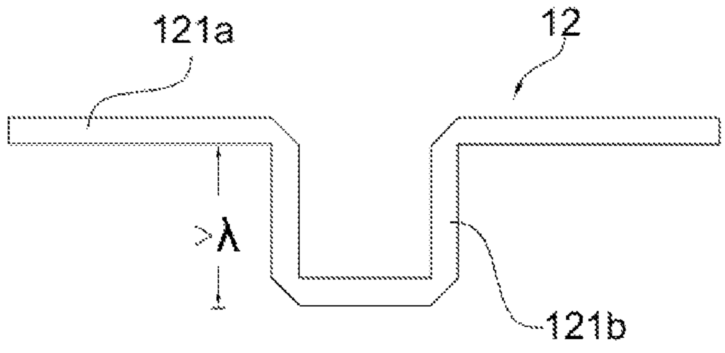
FIG. 3 is a schematic diagram showing a delay line formed by a conventional microstrip line according to some embodiments of the present disclosure.
Figure 4:
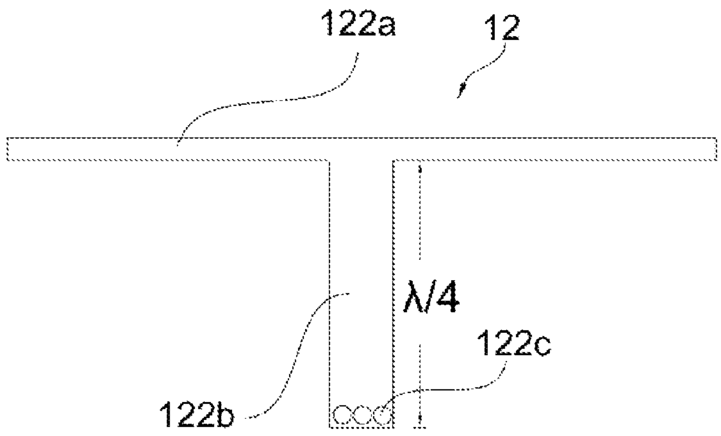
FIG. 4 is a schematic diagram showing a delay line formed by a short-circuit microstrip line according to some embodiments of the present disclosure.
Figure 5:
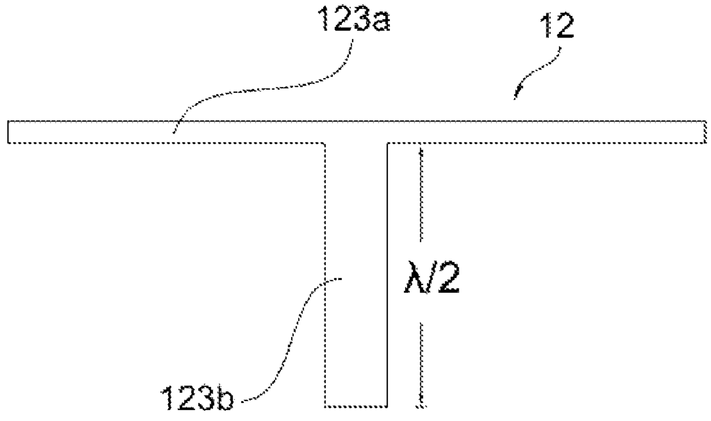
FIG. 5 is a schematic diagram showing a delay line formed by an open-circuit microstrip line according to some embodiments of the present disclosure.

In connection with FIGS. 3 to 5, the delay lines 12 of three different structures are used to achieve phase differences of signals input to the 90° electric bridge 13 at different frequencies. Specifically, as shown in FIG. 3, a delay line 12 formed by a conventional microstrip line includes a transmitting microstrip line body 121*a* and a U-shaped member formed by bending the transmitting microstrip line body downward. In order that one of the signals satisfies the phase distribution as shown in FIG. 2, a distance λ from a bottom of the transmitting microstrip line body to a bottom of the U-shaped member is greater than a wavelength of the input signal of the feed network.

As shown in FIG. 4, a delay line 12 formed by a short-circuit microstrip line 122*b* includes a first main transmitting microstrip line 122*a* and a short-circuit microstrip line 122*b*, wherein one terminal of the short-circuit microstrip line 122*b* is connected to the first main transmitting microstrip line 122*a*, and the opposite terminal is a short-circuit terminal, and the short-circuit terminal is provided with a grounding vias 122*c*. In some embodiments, the first main transmitting microstrip line 122*a* and a short-circuit microstrip line 122*b* are connected in a T-shape. Further, in order that one of the signals satisfies the phase distribution as shown in FIG. 2, the length of the short-circuit microstrip line 122*b* is a quarter of the wavelength of the input signal of the feed network.

As shown in FIG. 5, a delay line 12 formed by an open-circuit microstrip line 123*b* includes a second main transmitting microstrip line 123*a* and an open-circuit microstrip line 123*b*, wherein one terminal of the open-circuit microstrip line 123*b* is connected to the second main transmitting microstrip line 123*a*, and the opposite terminal is an open-circuit terminal. In some embodiments, the second main transmitting microstrip line 123*a* and the short-circuit microstrip line 123*b* are connected in a T-shape. Further, in order that one of signals satisfies the phase distribution as shown in FIG. 2, the length of the open-circuit microstrip line 123*b* is one-half of the wavelength of the input signal of the feed network.

The present disclosure can also effectively reduce the size of the feed network by using a delay line 12 formed by a short-circuit microstrip line 122*b* or an open-circuit microstrip line 123*b*.

Compared with the prior art, the feed network of the present disclosure adjusts the phase difference between signals input to the 90° electric bridge 13 by using the structures of the delay lines 12 shown in FIGS. 3 to 5, so that the phase difference between signals input to the 90° electric bridge 13 can satisfy the linear relationship as shown in FIG. 2, which ultimately causes the 90° electric bridge 13 to output the signals with the required amplitude, so that the lobe width of the wideband antenna within 1.695 GHz to 2.690 GHz can be controlled at 33°±2.5°, which greatly improves the convergence of the lobe width, and effectively improves the coverage of the base station.

Figure 6:
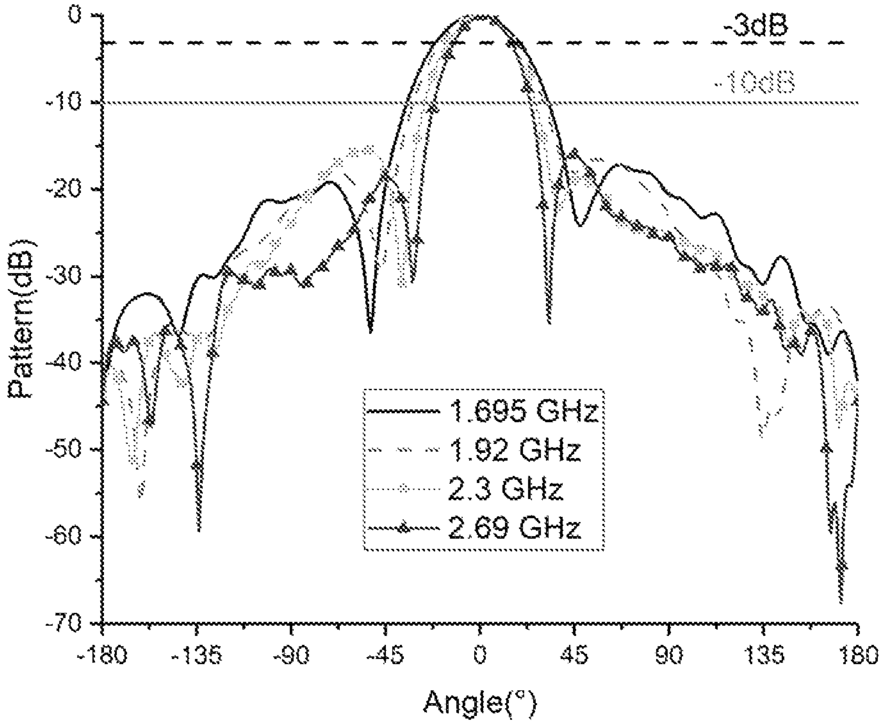
FIG.6 (Prior Art)
FIG. 6 illustrates an antenna pattern formed using a conventional feed network.
Figure 7:
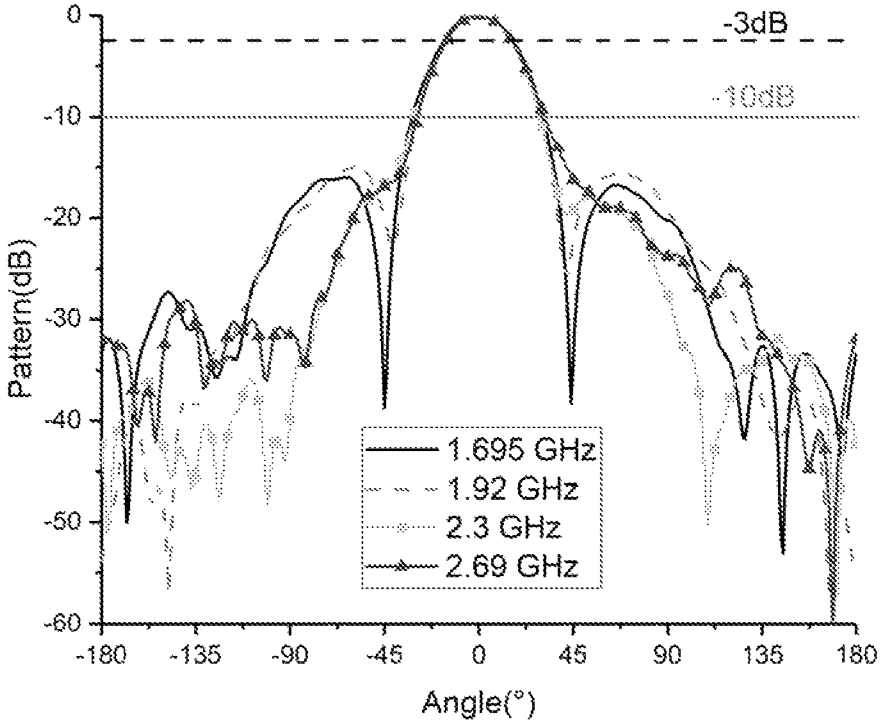
FIG. 7 illustrates an antenna pattern formed using an example feed network according to some embodiments of the present disclosure.

Further, in connection with FIGS. 6 and 7, FIG. 6 is a 33° antenna pattern of a conventional feed network, and FIG. 7 is a 33° antenna pattern of the feed network of the present disclosure. As can be seen from FIG. 6, when the conventional feed network is utilized, the −3 dB lobe width and −10 dB lobe width of wideband antenna at 1.695 GHz, 1.92 GHz, 2.3 GHz and 2.69 GHz are shown in the following table:

| Traditional feed network | | | | |
|---|---|---|---|---|
| Frequency (GHz) | 1.695 | 1.92 | 2.3 | 2.69 |
| −3 dB lobe width (°) | 39.32 | 35.65 | 30.24 | 26.68 |
| −10 dB lobe width (°) | 67.34 | 62.13 | 52.19 | 45.89 |

It can be seen from the above table that there are significant differences in the lobe width of the antenna of the traditional feed network in the four frequency points, wherein the difference between the maximum value and the minimum value of the −3 dB lobe width is 13°, the difference between the maximum value and the minimum value of the −10 dB lobe width is 22°, and the lobe width of the wideband antenna within 1.695 GHz to 2.690 GHz can be controlled at 33°±6.5°.

As can be seen from FIG. 7, when the feed network according to an embodiment of the present disclosure is utilized, the −3 dB lobe width and −10 dB lobe width of the wideband antenna at 1.695 GHz, 1.92 GHz, 2.3 GHz and 2.69 GHz are shown in the following table:

| Feed network of the present disclosure | | | | |
|---|---|---|---|---|
| Frequency (GHz) | 1.695 | 1.92 | 2.3 | 2.69 |
| −3 dB lobe width (°) | 35.88 | 34.27 | 33.39 | 32.42 |
| −10 dB lobe width (°) | 62.26 | 58.66 | 59.39 | 58.14 |

As can be seen from the above table, there are slight differences in the lobe width of the antenna of the feed network of the present disclosure in the four frequency points, wherein the difference between the maximum value and the minimum value of the −3 dB lobe width is about 2°, and the difference between the maximum value and the minimum value of the −10 dB lobe width is about 2°, and the lobe width of the wideband antenna within 1.695 GHz to 2.690 GHz can be controlled at 33°±2.5°. Compared to the traditional feed network, the difference between the maximum value and the minimum value of the −3 dB lobe width and the difference between the maximum value and the minimum value of the −10 dB lobe width are about 2°, which effectively improves the width convergence.

The technical content and technical features of the present disclosure have been disclosed, however, those skilled in the art may still make replacement and modification based on the teachings and disclosure of the invention without departing from the spirit of the present disclosure, and therefore, the scope of the invention should not be limited to the contents disclosed in the examples, but should include various substitutions and modifications that do not depart from the present disclosure, and are covered by the claims of this patent.

What is claimed is:

1. A feed network for improving a convergence of a lobe width of a wideband antenna, comprising: a first power divider, a delay line, a 90° electric bridge and a second power divider, wherein the first power divider is configured to convert an input signal of the feed network into a first signal and a second signal, transmit the first signal to the delay line, and transmit the second signal to the 90° electric bridge directly;

the delay line is configured to change a phase of the first signal and transmit the first signal to the 90° electric bridge;

the 90° electric bridge is configured to convert the received first signal and the received second signal into two signals having a same phase but different amplitudes, transmit one of the two signals to the second power divider, and output the other one of the two signals to a first radiator directly;

the second power divider is configured to output the one of the two signals to a second radiator; and the delay line includes a first main transmitting microstrip line and a short-circuit microstrip line connected in a T-shape, and a non-short-circuit terminal of the short-circuit microstrip line is connected to the first main transmitting microstrip line, and a short-circuit terminal of the short-circuit microstrip line is provided with a grounding vias.

2. The feed network according to claim 1, wherein the delay line includes a transmitting microstrip line body and a U-shaped member formed by bending the transmitting microstrip line body.

3. The feed network according to claim 2, wherein a distance from a bottom of the transmitting microstrip line body to a bottom of the U-shaped member is greater than a wavelength of the input signal of the feed network.

4. The feed network according to claim 1, wherein a length of the short-circuit microstrip line is one quarter of a wavelength of the input signal of the feed network.

5. The feed network according to claim 1, wherein phases of the first signal and the second signal input to the 90° electric bridge are reduced as a corresponding frequency increases.

6. The feed network according to claim 1, wherein the first power divider and the second power divider are 3 dB Wilkinson power dividers.

7. The feed network according to claim 6, wherein an output power distribution ratio of the second power divider is 1:N, wherein N is a natural number greater than 1.

8. The feed network according to claim 1, wherein an output power distribution ratio of the second power divider is 1:N, wherein N is a natural number greater than 1.

9. A feed network for improving a convergence of a lobe width of a wideband antenna, comprising: a first power divider, a delay line, a 90° electric bridge and a second power divider, wherein the first power divider is configured to convert an input signal of the feed network into a first signal and a second signal, transmit the first signal to the delay line, and transmit the second signal to the 90° electric bridge directly;

the delay line is configured to change a phase of the first signal and transmit the first signal to the 90° electric bridge;

the 90° electric bridge is configured to convert the received first signal and the received second signal into two signals having a same phase but different amplitudes, transmit one of the two signals to the second power divider, and output the other one of the two signals to a first radiator directly;

the second power divider is configured to output the one of the two signals to a second radiator; and the delay line includes a second main transmitting microstrip line and an open-circuit microstrip line connected in a T-shape, and wherein a non-open-circuit terminal of the open-circuit microstrip line is connected to the second main transmitting microstrip line.

10. The feed network according to claim 9, wherein a length of the open-circuit microstrip line is one-half of a wavelength of the input signal of the feed network.

11. The feed network according to claim 9, wherein the delay line includes a transmitting microstrip line body and a U-shaped member formed by bending the transmitting microstrip line body.

12. The feed network according to claim 11, wherein a distance from a bottom of the transmitting microstrip line body to a bottom of the U-shaped member is greater than a wavelength of the input signal of the feed network.

13. The feed network according to claim 9, wherein phases of the first signal and the second signal input to the 90° electric bridge are reduced as a corresponding frequency increases.

14. The feed network according to claim 9, wherein the first power divider and the second power divider are 3 dB Wilkinson power dividers.

15. The feed network according to claim 14, wherein an output power distribution ratio of the second power divider is 1:N, wherein N is a natural number greater than 1.

16. The feed network according to claim 9, wherein an output power distribution ratio of the second power divider is 1:N, wherein N is a natural number greater than 1.

* * * * *